United States Patent [19]

Bernard et al.

[11] Patent Number: 4,714,396

[45] Date of Patent: Dec. 22, 1987

[54] PROCESS FOR CONTROLLING THE CHARGING OF A SHAFT FURNACE

[76] Inventors: Gilbert Bernard, 6 rue Robert Schuman, Hemldange; Emile Breden, 29 rue du Village, God brange; Emile Lonardi, 30 rue de Schouweiler, Bascgarage, all of Luxembourg

[21] Appl. No.: 862,083

[22] Filed: May 12, 1986

[30] Foreign Application Priority Data

May 10, 1985 [LU] Luxembourg .......................... 85892

[51] Int. Cl.[4] .............................................. B65G 25/00

[52] U.S. Cl. ...................................... 414/161; 222/56; 414/21; 414/147

[58] Field of Search ............... 414/161, 294, 298, 160, 414/147, 21; 222/56

[56] References Cited

U.S. PATENT DOCUMENTS 3,682,339 8/1972 Johannes ............................ 414/161
4,071,166 1/1978 Leguille ............................ 414/21 X
4,243,351 1/1981 Leguille et al. ................. 414/161 X
4,527,714 7/1985 Bowman ............................ 222/56
4,659,274 4/1987 France ............................ 414/21 X

FOREIGN PATENT DOCUMENTS 0078730 6/1981 Japan .................................. 414/160

*Primary Examiner*—James T. McCall
*Attorney, Agent, or Firm*—Fishman & Dionne

[57] ABSTRACT

A process for controlling the charging of a shaft furnace of the type utilizing a distribution spout and one or more storage hoppers with each hopper being provided with a dosing device for regulating the flow of charging material from the hopper to the spout. The shaft furnace also includes a weighing system to determine the contents (weight) of the hopper and to adjust the position of the dosing device wherein the dosing valve is opened whenever the real flow $Q_r$ is below the reference flow $Q_c$ and is held in position when the real flow $Q_r$ is above the reference flow $Q_c$.

7 Claims, 4 Drawing Figures

PROCESS FOR CONTROLLING THE CHARGING OF A SHAFT FURNACE

BACKGROUND OF THE INVENTION

This invention relates to a process for controlling the charging of a shaft furnace of the type which utilizes a rotary or oscillating distribution spout for distributing charge material over the charging surface of the furnace. One or more hoppers for storage of the charge material are located above the furnace. Each hopper is provided with a dosing device for regulating the flow of charging material from the hopper to the spout; and a weighing system for determining the contents (weight) of the hopper. This known process determines (by calculation or by experiment), the extent to which the dosing valve must be initially opened for the contents of a hopper to flow out within a given time period, and retains the theoretical curves of a given constant flow in memory for different types of material and different charging conditions. This process also retains, in memory, the corresponding position of the dosing valve required to ensure the ouflow within the given period. These curves indicate the reference flow $Q_c$ and the position of the valve at each selected moment. The real flow $Q_r$ is determined at given intervals by measuring the reduction of weight $\Delta P$ in the contents of the hopper per unit time $\Delta t$; and comparing the real flow $Q_r$ with the reference flow $Q_c$.

The charging of a shaft furnace by means of a distribution spout is typically carried out so as to deposit a diametrically symmetrical and circularly uniform layer on the charging surface using charge material eminating from a storage hopper. For this purpose, there is generally a predetermined charging period available which is governed by (1) the yield and capacity of the furnace; (2) the method of distribution; and (3) the coordination of the operations, such as the opening and closing of the valves, the transport of the charging material to the required position, etc.

When this available time period is known, the opening of the dosing valve controlling the outflow from the hopper has to be regulated such that the hopper will be empty at the moment in which the spout has swept over its complete trajectory i.e. (at the expiration of the required time period).

For this purpose, the dosing valve is regulated in the manner described above and also discussed in U.S. Pat. Nos. 3,929,240 and 4,074,816 both of which are assigned to the assignee hereof and incorporated herein by reference. In theory, an adjustment of the dosing valve as described above should make it possible to deposit the exact layer of charge material required by the smelter. Unfortunately, in practice, this is not the case because certain parameters may influence the flow regardless of the position of the valve. For example, when the degree of opening of the valve is selected on the basis of memorized standard (known) data and the nature of the material to be charged, in order to obtain a certain given rate of flow, it has been found that at the beginning of the flow phase, the weight of the column of material above the discharge aperture may increase the flow rate. On the other hand, as and when the hopper empties, the flow rate decreases as a result of the reduction in the weight of the hopper material; the rate of flow thus being reduced to below the referenced flow rate. As the operation is slowed up in this matter, the period within which the contents of a hopper has to be discharged into the furnace is inevitably exceeded. This not only upsets the charging program, but also prevents the charge layer from remaining symmetrical. Variations of the charge thus occur in the height of the material around the circular trajectory of the charging surface. The flow may also be affected by further factors such as the degree of humidity or the grain size of the material.

In order to remedy this drawback, attempts have been made to correct the position of the dosing valve in accordance with the fluctuations in the rate of flow, i.e., by slightly closing it when the real flow, as measured by the reduction in the weight of the hopper, exceeds the reference flow (opening it wider when the flow falls below this latter value). In reality, however, the flow corresponding to a certain position of the valve can only be determined after this position has been actually reached, and in view of the lapse of time involved in determining the flow, the ideal position or reference position of the valve when positional correstions are being carried out is invariably reached before this can be known. In other words, whatever the direction the valve moves, i.e., whether it opens or closes, it will always be displaced by an excessive amount, so that it then has to be corrested by moving it in the opposite direction. The result is that the real rate of flow constantly fluctuates about the reference value. This result is discussed in more detail hereinafter with reference to FIG. 2.

The only favorable result obtainable with the process described above is that it permits accurate adherence (more or less) to the time required for the discharge of the contents of a hopper. On the other hand, due to the fluctuations in the rate of flow, the deposit of the charging material is rendered still more uneven than if no corrections were made. Moreover, this process involves an additional inconvenience inasmuch as the reversals of the displacement of the valve, as it opens and closes in alternation, cause jerky moments leading to "false impulses" in the weight measuring systems.

SUMMARY OF THE INVENTION

The above-discussed and other problems and deficiencies of the prior art are overcome or alleviated by the process of the present invention wherein a novel method of operating a dosing valve is provided which ensures almost constant rate of charge material flow corresponding to the reference flow.

In accordance with the present invention, a process is provided for controlling the charging of a shaft furnace of the type which utilizes a rotary oscillating distribution spout for distributing charge material over the charging surface of the furnace. One or more hoppers for the storage of the charge material are located above the furnace. Each hopper is provided with a dosing device for regulating the flow of charging material from the hopper to the spout; and a weighing system for determining the contents (weight) of the hopper. The process of the present invention determines (by calculation or by experiment), the extent to which the dosing valve must be initially opened for the contents of the hopper to flow out within a given time period, and retains the theoretical curves of a given constant flow in memory for different types of material and different charging conditions. The process of the present invention also retains in memory, the corresponding position of the dosing valve required to ensure the outflow within the given period. These curves indicate the reference flow $Q_c$ and the position of the valve, at a selected moment, the real flow $Q_r$ being determined at given intervals by measuring the reduction of weight $\Delta P$ in the contents of the hopper per unit time $\Delta t$; and comparing the real flow $Q_r$ with the reference flow $Q_c$. A significant feature of the present invention is that the dosing valve is opened whenever the real flow $Q_r$ is below the reference flow $Q_c$ with the dosing valve being held in position when the real flow $Q_r$ is above the reference flow $Q_c$.

The amplitude $\Delta S$ selected for the opening of the valve is preferably equal to the difference between the valve position corresponding to the reference flow $Q_c$ and that valve position corresponding to the real flow $Q_r$.

In one preferred embodiment of the present invention, the speed at which the valve actuates is proportional to the difference $\Delta S$, so that if this difference $\Delta S$ is considerable, the valve is displaced comparatively rapidly; while if the difference $\Delta S$ is only slight, the valve is displaced slowly. By way of an additional measure for ensuring that the valve will not move past the intended position, its displacement speed becomes zero when the difference $\Delta S$ reaches a predetermined minimum.

The above-discussed and other features and advantages of the present invention will be understood and appreciated to those skilled in the art from the following detailed description and drawings.

DESCRIPTION OF THE PREFERRED EMBODIMENT

Figure 1:
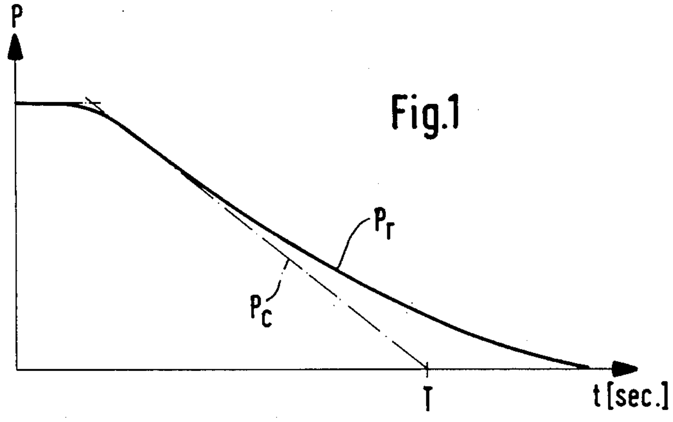
FIG. 1 is a curve showing the reduction in weight undergone by the hopper when the dosing valve position is not corrected.

In FIG. 1, the curve in the thick (continuous) line represents the real weight $P_r$ (i.e. the weight measured) in the hopper, while the dot-and-dash lines represents the reference weight which should enable the charging material to flow at an even rate in the required period T. The gradient of these curves, i.e. $\Delta P/\Delta T$ repreents the rate of flow, which is constant for the curve $P_c$.

As is shown in FIG. 1, the horizontal portion of each of the curves $P_r$ and $P_c$ represents the dosing valve opening phase. When the valve has reached its opened position, corresponding to the set or reference flow $Q_c$, (calculated in accordance with known, memorized data and based on calculations or experiments in previous charging operations), the reduction in the rate of the hopper should be linear, in order to ensure a constant rate of flow corresponding to the reference flow $Q_c$. However, as shown by the evolution of the two curves, from a certain time forward the difference between the weight and the material actually present in the hopper, and that of the material which still ought to be present therein in order to fulfill the constant rate of flow $Q_c$, becomes greater and greater so that the hopper will not be empty until a long time after the end of the required period T.

Figure 2:
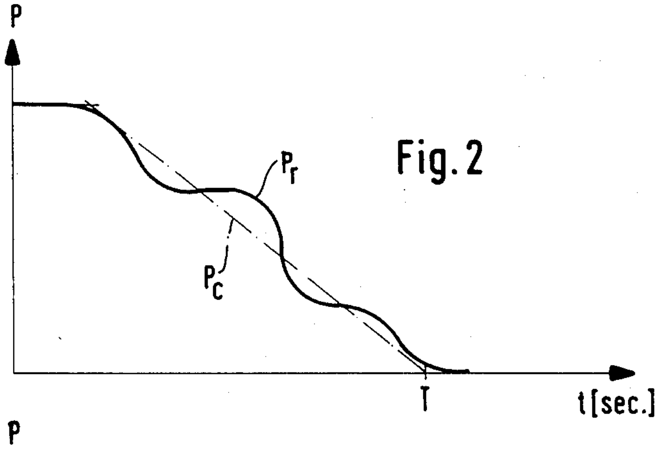
FIG. 2 is a curve showing the reduction of the weight of the hopper with correction of the valve position in both directions in accordance with the present invention.

As discussed above, prior art attempts to correct the position of the dosing valve in an attempt to compensate for the difference between the curves $P_r$ and $P_c$ leads to the situation shown in FIG. 2, in which the real flow oscillates about the reference value. This is because in each case, the valve is displaced an excessive amount, whatever the direction in which it is to be moved.

Figure 3:
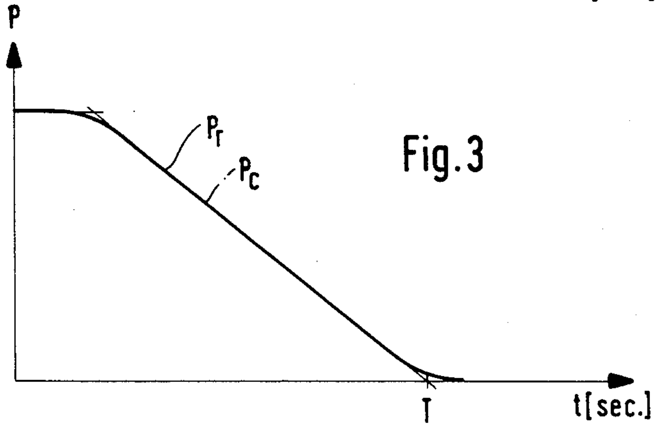
FIG. 3 is a curve showing the reduction of the weight of the hopper when the position of the valve is corrected in accordance with the present invention in one direction only.

Significantly, if the operations are carried out in accordance with the present invention, i.e., if the position of the dosing valve is only corrected in the opening direction, curve $P_r$ is thereby linearized and caused to coincide with curve $P_c$ so that the reference flow is actually achieved (as shown in FIG. 3).

If the operation of the present invention results in an excessive opening of the valve, i.e. if the measured flow is greater than the reference flow, the valve is not moved, (because from the information provided in FIG. 1, it is known that the flow will inevitably decrease without changing the position of the valve).

Figure 4:
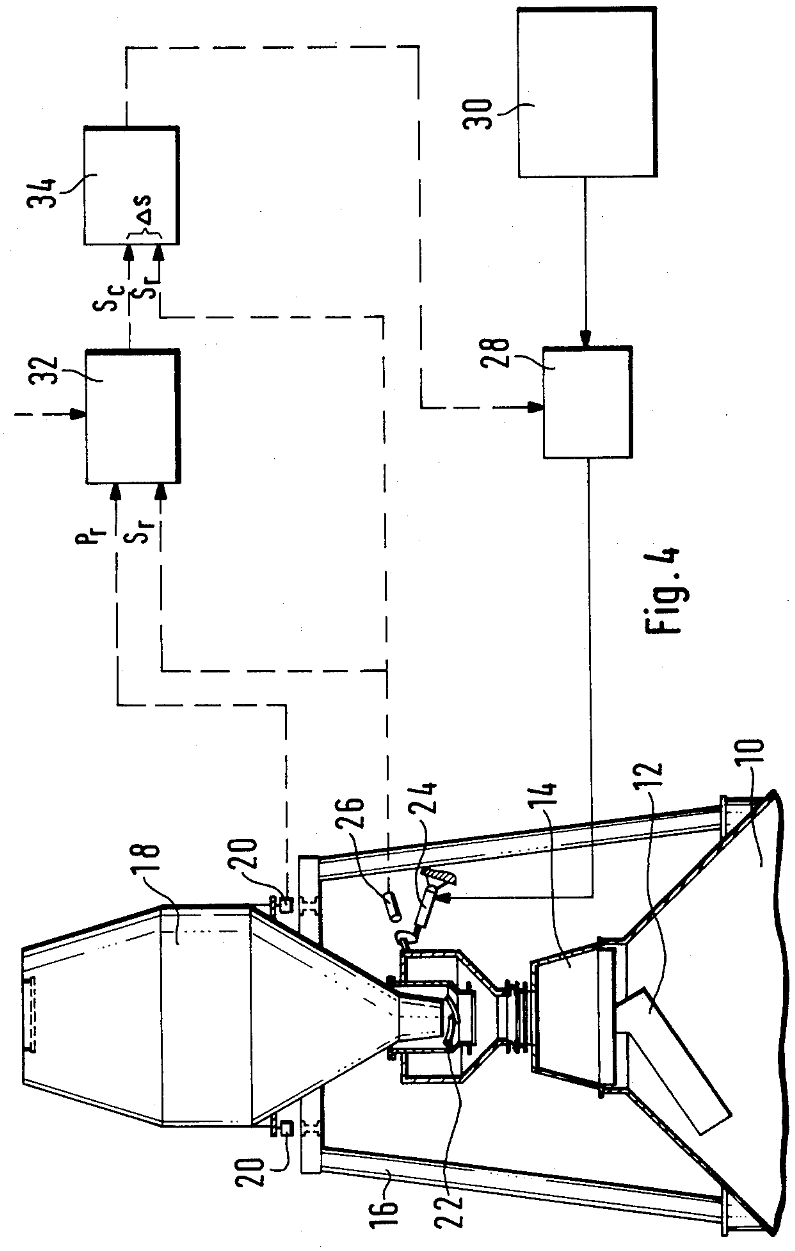
FIG. 4 is a schematic view of a device for performing the process of the present invention.

In FIG. 4, description of a preferred method of carrying out the dosing valve position correction operation of the present invention is provided. FIG. 4 shows the head of a furnace 10 having a spout 12 therein. A driving device 14 causes spout 12 to rotate about the axis of the furnace 10 and adjust its discharge angle. A frame 16 borne by furnace 10 supports a hopper 18 via a set of pressure cells 20. Pressure cells 20 continuously indicate the weight of hopper 18 (and thus the contents of hopper 18). The discharge orifice of hopper 18 is controlled by dosing valve 22 which may consist of two registers which undergo symmetrical displacement about the axis of the furnace. Dosing valve 22 is actuated by a hydraulic cylinder 24, while the real position of the valve is continuously determined by a position detector 26.

FIG. 4 shows a single central charging hopper 18. Nevertheless, it will be appreciated that the present invention is equally applicable to other known installations comprising two or more charging hoppers.

Hydraulic cylinder 24 (controlling the position of the dosing valve 22) is actuated by a hydraulic gate 28 of the "proportional action" type which receives the hydraulic fluid (oil) under pressure from a hydraulic supply 30. The control circuit includes a computer 32 which effect the calculations and memorizes all the necessary data. The information from computer 32 is transmitted to a control unit 34 which controls the hydraulic gate 28 in order to regulate the flow of oil, i.e., the operating speed of hydraulic cylinder 24 and valve 22.

Computer 32 continuously receives information $P_r$ and $S_r$ representing the real weight of contents of the hopper 18 and the real position of dosing valve 22, respectively. Computer 32 also receives reference data through the charging program, particularly the time T selected for the outflow of the contents of hopper 18 as a function of the charging program and/or the distribution of the carge material. Computer 32 memorizes the information required for the control action, such as various parameters relativng to the nature of the charging material, the vavle position required to ensure a certain output of a particular material, etc. This memorized information is mainly derived from successive operations of updating the information up-to-date in the light of knowledge obtained from previous charging processes. It is on the basis of this data that computer 32 calculates and provides instructions to control unit 34 for the operation of valve 22. For example, knowing the time T required for the discharge of the contents of hopper 18 and knowning the weight of the contents and the parameters relating to the nature of the materials (particularly its grain size and possibly other parameters which influence the speed of discharge), computer 32 determines the reference flow $Q_c$ and, from the $Q_c$ parameter, the initial opening positioning of valve 22. On the basis of the instructions received from computer 32, control unit 34 controls hydraulic gate 28 which actuates cylinder 24 until valve 22 occupies the reference opening position. This operation is controlled by detector 26, which supplies the information concerning the momentary position of the valve to the control unit; which terminates the opening movement of valve 22 when the difference $\Delta S$ between the real position $S_r$ and the reference position $S_c$ is approximately zero. From this moment forward i.e., when valve 22 occupies its reference opening position, computer 32 determines, at present intervals (e.g. every three or four seconds), the rate of reduction of the weight of hopper 18. Three different sets of circumstances may then arise:

1. If the real flow $Q_r$, i.e., the reduction of weight $P_r$ per unit time, is equal to the reference flow $Q_c$ or differs therefrom by a negligible quantity, arbitrarily fixed in advance, valve 22 is kept in its initial open position.

2. If the real flow $Q_r$ is above the reference flow $Q_c$, i.e., if the position $S_r$ of the valve is excessive and $S=S_c-S_c$ is negative, no correction of the valve position is carried out, since it is known, in accordance with the details shown in FIG. 1, that the flow $Q_r$ will automatically decrease without any alteration in the position of valve 22 and will approach the reference $Q_c$. As a precautionary measure, e.g., to provide for programming errors, the system can nevertheless be arranged so that if $\Delta S$ rises exceptionally above a certain upper limit, the valve will automatically be closed to that extent which corresponds to the preselected limit.

3. If the real flow $Q_r$ falls below the reference $Q_c$, this indicates that the previous reference position $S_c$ of the valve 22 was in actual fact insufficient, in which case a valve position correction is carried out. For this purpose, the computer calculates the valve positions corresponding to the reference flow $Q_c$ and to the real flow $Q_r$, respectively, and determines the difference $\Delta S$ between these two positions. The control unit 34 then acts via the hydraulic gate 28 to open the valve 22 by a value equal to $\Delta S$. This correction is repeated whenever it becomes necessary, i.e., whenever the real flow deviates by a certain predetermined valaue from the reference flow. These successively corrected reference positions of valve 22 are memorized (recorded) in the computer 32, so that the next charging operation which is carried out under comparable conditions will call for less and less frequent correction, if any are necessary at all.

In one particularly advantageous method of utilizing the present invention, the flow of hydraulic fluid (oil) is regulated by valve 28 as determined by control unit 34 in accordance with the value $\Delta S$ (i.e., valve 28 is displaced more rapidly when $\Delta S$ is considerable; and more and more slowly as $\Delta S$ decreases). It is even preferable to stop the valve when $\Delta S$ reached a predetermined lower limit, in order to be certain that the valve will not pass its reference position (with the risk of repeating the situation illustrated in FIG. 2).

Finally, it should be emphasized that the hardware described by reference to FIG. 4 for the performance of the process has only been adopted by way of illustration and that certain elements can be replaced by others performing the same functions. For example, the hydraulic control circuit of the regulating valve can be replaced by pneumatic circuit or electrical network. In that case, valve 28 of the "proportional action" type would be replaced by a servo-valve or a thyristor circuit, respectively.

While the preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A process for controlling the charging of a shaft furnace of the type having a rotary or oscillating distribution spout for distributing charge material over the charging surface of the furnace, wherein the furnace includes one or more hoppers for the storage of charge material above the furnace, each hopper being provided with a dosing valve for regulating the flow of charging material from the hopper to the spout, the furnace further including a weighing system for determining the contents of the hoppers, the weighing system determining the extent to which the valve must be initially open for the contents of the hopper to flow out within a given period, and memorizes, for different types of material and different charging conditions, the theoretical curves of a given constant out flow and the corresponding position of the dosing valve required to ensure the outflow within the given period, these curves indicating at each moment the reference flow $Q_c$ and the position of the dosing valve including the steps of:

determining the real flow $Q_r$ of charge material at given intervals by measuring the reduction of weight $\Delta P$ in the contents of the hopper per unit time $\Delta t$;

comparing the real flow $Q_r$ with the reference flow $Q_c$;

opening the dosing valve whenever the real flow $Q_r$ is above the reference flow $Q_c$.

2. The process of claim 1 including the step of:

selecting the initial opening of the dosing valve to ensure that the resulting flow corresponds to the calculated reference flow $Q_c$.

3. The process of claim 1 including the step of:

selecting the amplitude $\Delta S$ for the opening of the valve to be equal to the difference between the valve position corresponding to the reference flow $Q_c$ and the valve positon corresponding to the real flow $Q_r$.

4. The process of claim 1 including the step of:

regulating the speed at which the valve acts to be proportional to the difference $\Delta S$ of the necessary valve displacement.

5. The process of claim 3 including the step of:

regulating the speed at which the valve acts to be proportional to the difference $\Delta S$ of the necessary valve displacement.

6. The process of claim 4 including the step of:

regulating the valve displacement speed to zero when the difference $\Delta S$ reaches a predetermined minimum.

7. The process of claim 5 including the step of:

regulating the valve displacement speed to zero when the difference $\Delta S$ reaches a predetermined minimum.

* * * * *